US010205358B2

United States Patent
Hao et al.

(10) Patent No.: US 10,205,358 B2
(45) Date of Patent: Feb. 12, 2019

(54) ELECTRIC MACHINE FOR A VEHICLE POWERTRAIN AND THE ELECTRIC MACHINE INCLUDES A PERMANENT MAGNET

(71) Applicant: GM GLOBAL TECHNOLOGY OPERATIONS LLC, Detroit, MI (US)

(72) Inventors: Lei Hao, Warren, MI (US); Chandra S. Namuduri, Warren, MI (US); Murali Pandi, Madurai (IN); Thomas Wolfgang Nehl, Shelby Township, MI (US); Avoki M. Omekanda, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 588 days.

(21) Appl. No.: 14/449,225

(22) Filed: Aug. 1, 2014

(65) Prior Publication Data

US 2015/0295459 A1    Oct. 15, 2015

(30) Foreign Application Priority Data

Apr. 12, 2014    (IN) .............................. 457/KOL/2014

(51) Int. Cl.
*H02K 1/27*    (2006.01)
*B60W 20/10*    (2016.01)
(Continued)

(52) U.S. Cl.
CPC ............... *H02K 1/276* (2013.01); *B60K 6/26* (2013.01); *B60K 6/387* (2013.01); *B60K 6/48* (2013.01);
(Continued)

(58) Field of Classification Search
CPC ........ H02K 1/27; H02K 1/276; H02K 1/2713; H02K 1/272; H02K 1/274; H02K 1/2753;
(Continued)

(56) References Cited

U.S. PATENT DOCUMENTS 2,990,508 A * 6/1961 Thompson ............. H02K 19/30
310/181
5,166,568 A * 11/1992 Nystuen ................ D06F 37/304
310/184
(Continued)

FOREIGN PATENT DOCUMENTS

CN    1202028 A    12/1998
CN    1856921 A    11/2006
(Continued)

OTHER PUBLICATIONS

Milind Paradkar, Design of a High Performance Ferrite Magnet-Assisted Synchronous Reluctance Motor for an Electric Vehicle, Institute of Electrical and Electronics Engineers, 2012, pp. 4079-4083.

Primary Examiner — Bernard Rojas
Assistant Examiner — Alexander Singh
(74) Attorney, Agent, or Firm — Quinn IP Law

(57) ABSTRACT

An electric machine is provided that includes a rotor assembly having a rotor core configured to support permanent magnets spaced around the rotor core to define a number of rotor poles. The rotor core has multiple rotor slots arranged as multiple barrier layers at each of the rotor poles. The rotor core is configured so that the electric machine satisfies predetermined operating parameters. In one embodiment, the electric machine is coupled with an engine through a belt drive train and provides cranking (engine starting), regeneration and torque assist modes.

20 Claims, 10 Drawing Sheets

(51) Int. Cl.
  *B60K 6/26* (2007.10)
  *H02K 1/16* (2006.01)
  *B60K 6/387* (2007.10)
  *B60K 6/48* (2007.10)
  *B60K 6/485* (2007.10)
  *H02K 1/24* (2006.01)

(52) U.S. Cl.
  CPC ............ *B60K 6/485* (2013.01); *B60W 20/10* (2013.01); *H02K 1/165* (2013.01); *H02K 1/274* (2013.01); *H02K 1/2713* (2013.01); *H02K 1/2766* (2013.01); B60K 2006/268 (2013.01); B60K 2006/4833 (2013.01); H02K 1/246 (2013.01); Y02T 10/56 (2013.01); Y02T 10/6221 (2013.01); Y02T 10/6226 (2013.01); Y10S 903/903 (2013.01)

(58) Field of Classification Search
  CPC .... H02K 1/2773; H02K 1/2766; H02K 1/165; B60W 20/10; B60K 6/26; B60K 2006/268; B60K 6/485; B60K 6/48; B60K 6/387; B60K 2006/4833; Y10S 903/903; Y02T 10/6221; Y02T 10/56; Y02T 10/6226
  USPC ............ 310/156.57, 156.01, 156.83, 156.84, 310/156.56
  See application file for complete search history.

(56) References Cited

U.S. PATENT DOCUMENTS

| | | | |
|---|---|---|---|
| 5,429,687 A | 7/1995 | Goffart | |
| 8,928,197 B2 | 1/2015 | Jurkovic et al. | |
| 8,933,606 B2 | 1/2015 | Rahman et al. | |
| 2002/0190587 A1 | 12/2002 | Reutlinger | |
| 2005/0140236 A1* | 6/2005 | Jeong | H02K 1/2766 310/156.53 |
| 2006/0017345 A1* | 1/2006 | Uchida | H02K 1/2766 310/156.56 |
| 2006/0103254 A1* | 5/2006 | Horst | H02K 1/276 310/156.53 |
| 2006/0208606 A1 | 9/2006 | Hirzel | |
| 2007/0216249 A1* | 9/2007 | Gruendel | H02H 7/0833 310/156.02 |
| 2008/0007131 A1* | 1/2008 | Cai | H02K 1/2766 310/156.38 |
| 2009/0045688 A1* | 2/2009 | Liang | H02K 1/2766 310/156.07 |
| 2010/0079026 A1* | 4/2010 | Han | H02K 1/2766 310/156.53 |
| 2010/0090557 A1 | 4/2010 | El-Refaie et al. | |
| 2010/0109468 A1 | 5/2010 | Natsumeda et al. | |
| 2010/0244610 A1* | 9/2010 | Hao | H02K 1/30 310/179 |
| 2011/0109180 A1* | 5/2011 | Akutsu | B60K 6/448 310/77 |
| 2011/0169363 A1* | 7/2011 | Summers | H02K 21/22 310/156.01 |
| 2011/0198962 A1* | 8/2011 | Tang | H02K 3/28 310/198 |
| 2012/0020117 A1 | 1/2012 | Arnold et al. | |
| 2012/0187877 A1* | 7/2012 | Yamagiwa | H02K 1/276 318/400.02 |
| 2012/0262022 A1 | 10/2012 | Takemoto et al. | |
| 2013/0026872 A1* | 1/2013 | Cirani | H02K 1/2766 310/156.08 |
| 2013/0069470 A1 | 3/2013 | Jurkovic et al. | |
| 2013/0147303 A1* | 6/2013 | Kaiser | H02K 1/2766 310/156.38 |
| 2013/0241369 A1 | 9/2013 | Imazawa et al. | |
| 2013/0270952 A1* | 10/2013 | Jurkovic | H02K 1/2766 310/156.01 |
| 2013/0342062 A1 | 12/2013 | Sekii et al. | |
| 2014/0010671 A1 | 1/2014 | Cryer et al. | |
| 2014/0046520 A1 | 2/2014 | Katoch et al. | |
| 2014/0125205 A1 | 5/2014 | Landfors et al. | |
| 2014/0152139 A1* | 6/2014 | Huang | H02K 1/2766 310/156.38 |
| 2014/0252903 A1 | 9/2014 | Rahman et al. | |
| 2015/0091406 A1 | 4/2015 | Tajima et al. | |
| 2015/0171676 A1 | 6/2015 | Kobayashi et al. | |

FOREIGN PATENT DOCUMENTS

| | | |
|---|---|---|
| CN | 102263445 A | 11/2011 |
| CN | 202444342 U | 9/2012 |
| CN | 202545085 U | 11/2012 |
| JP | 2000316241 A | 11/2000 |

\* cited by examiner

ELECTRIC MACHINE FOR A VEHICLE POWERTRAIN AND THE ELECTRIC MACHINE INCLUDES A PERMANENT MAGNET

CROSS-REFERENCE TO RELATED APPLICATION

This application claims the benefit of India Provisional Application No. 457/KOL/2014 filed Apr. 12, 2014, which is hereby incorporated by reference in its entirety.

TECHNICAL FIELD

The present teachings generally include an electric machine for a vehicle powertrain, and more particularly, an interior permanent magnet motor.

BACKGROUND

An electric motor utilizes electric potential energy to produce mechanical torque through the interaction of magnetic fields and electric current-carrying conductors. Some electric motors can also function as generators by using torque to produce electrical energy. An interior permanent magnet electric machine has a rotor assembly that includes a rotor core with magnets of alternating polarity spaced around the rotor core.

SUMMARY

An electric machine is provided that includes a rotor assembly having a rotor core configured to support permanent magnets spaced around the rotor core to define a number of rotor poles. The rotor core has multiple rotor slots arranged as multiple barrier layers at each of the rotor poles. One or more of the barrier layers at each rotor pole may house permanent magnets. The rotor core is configured with an optimal geometry to satisfy predetermined operating parameters. The electric machine may be configured with a multi-phase stator assembly and an interior permanent magnet assisted synchronous reluctance rotor assembly. In particular, the electric machine is designed to achieve predetermined operating parameters including a high efficiency, a high power density and/or a high torque density, a relatively wide peak power range, a maximum speed, a relatively low cost, a relatively low mass and inertia, and three phase shorted currents less than rated current, and has the ability to fit into a relatively small packaging space. In one embodiment, the electric machine is coupled with an engine through a belt drive train and provides engine cranking (i.e., starting), regeneration and torque assist modes.

The above features and advantages and other features and advantages of the present teachings are readily apparent from the following detailed description of the best modes for carrying out the present teachings when taken in connection with the accompanying drawings.

DETAILED DESCRIPTION

Figure 1:
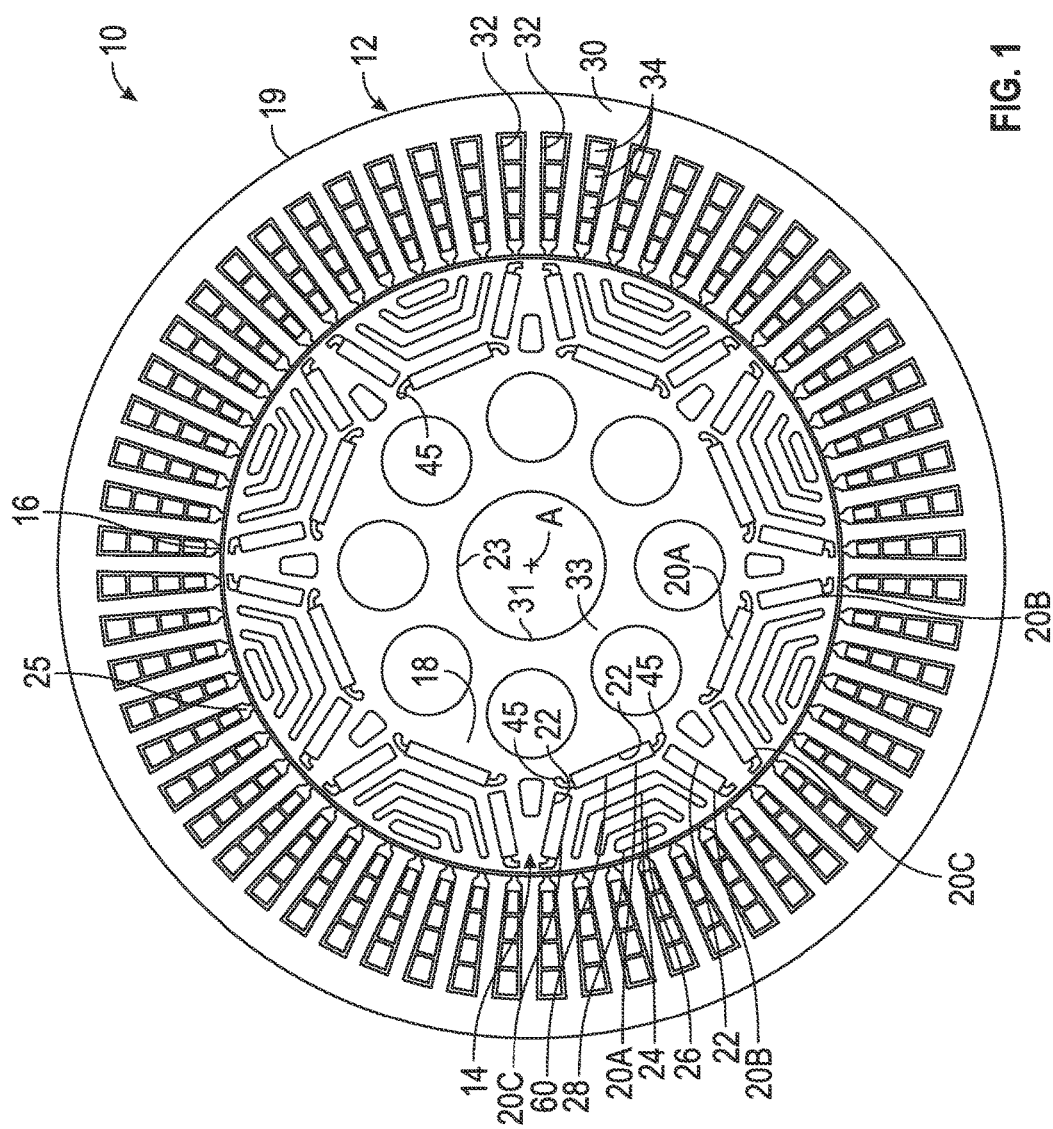
FIG. 1 is a schematic illustration in side view of a first embodiment of an electric machine in accordance with the present teachings.
Figure 4:
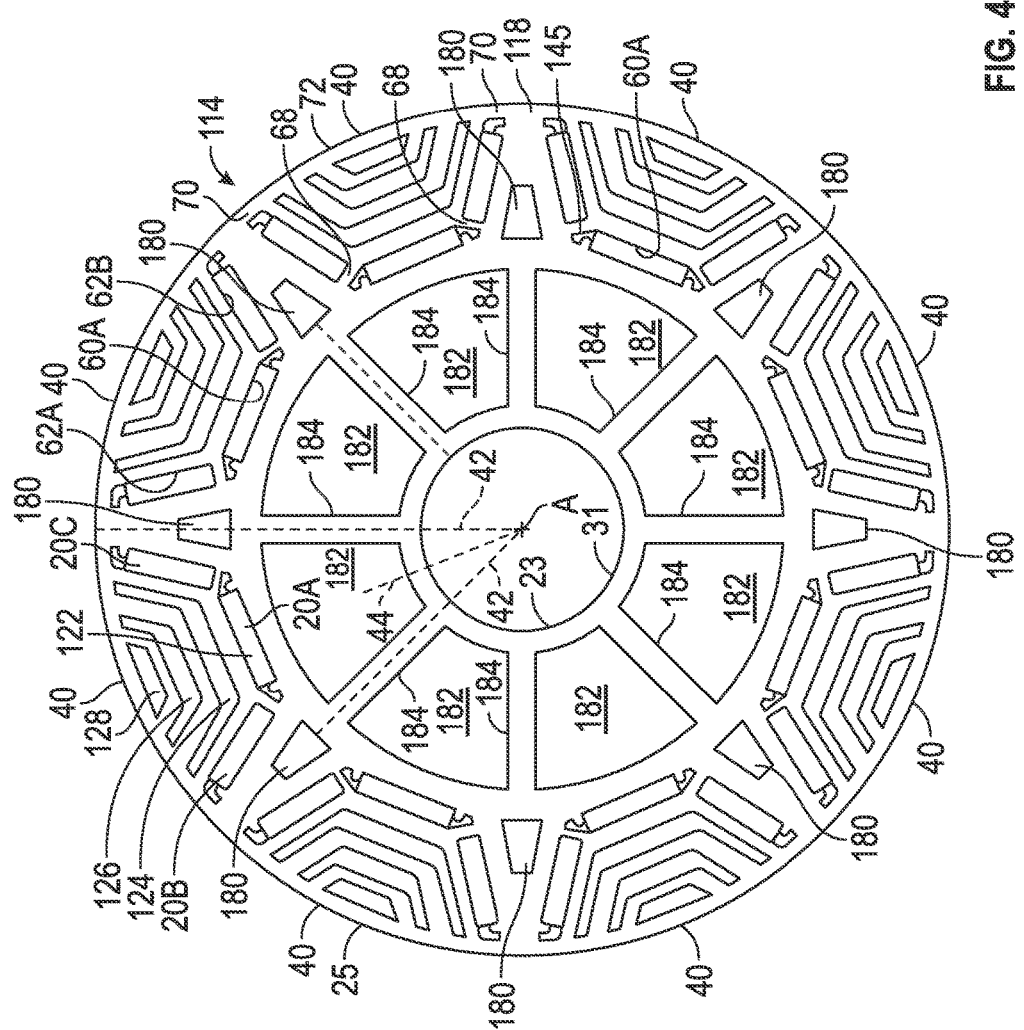
FIG. 4 is a schematic illustration in side view of a second embodiment of a rotor assembly for use in the electric machine of FIG. 1 in accordance with the present teachings.
Figure 5:
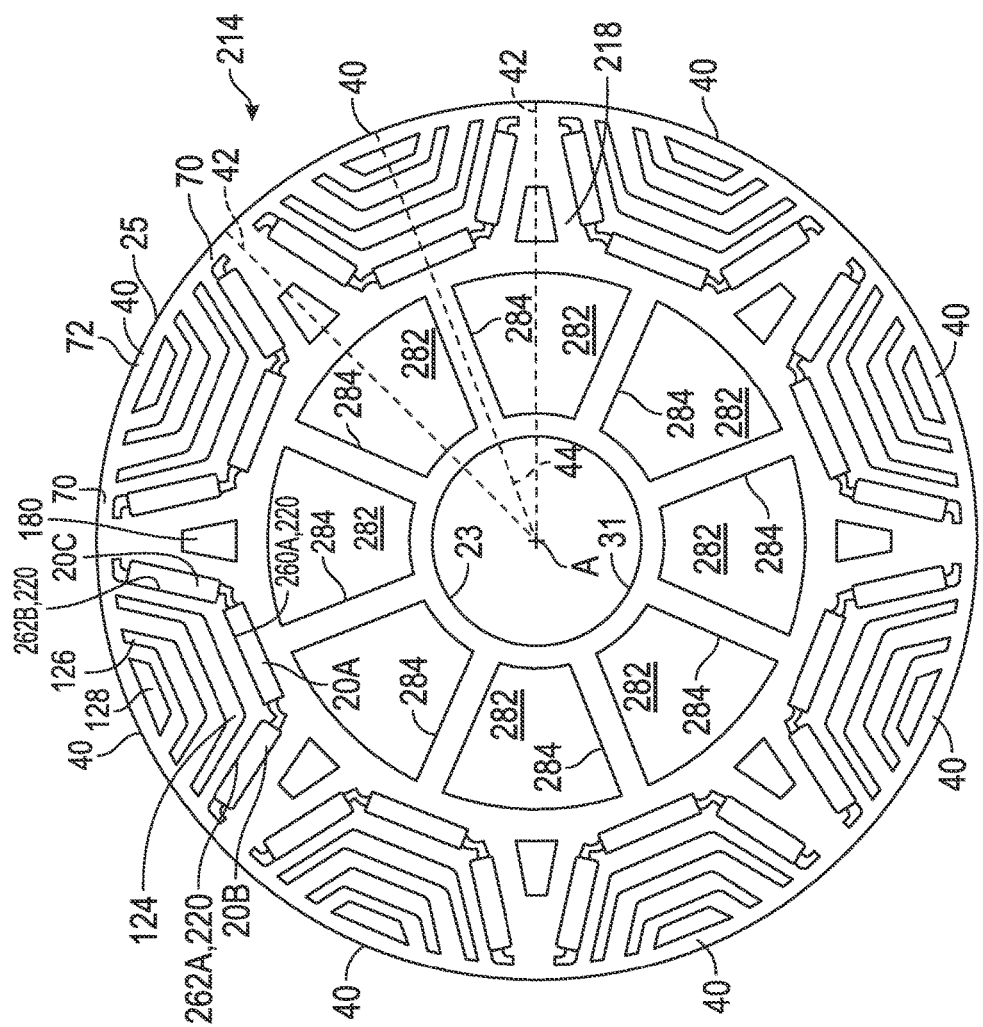
FIG. 5 is a schematic illustration in side view of a third embodiment of a rotor assembly for use in the electric machine of FIG. 1 in accordance with the present teachings.

Referring to the drawings, wherein like reference numbers refer to like components throughout the views, FIG. 1 shows an electric machine 10 having a stator assembly 12 and a rotor assembly 14. As discussed herein, the electric machine 10 has a multi-phase stator assembly 12 and an interior permanent magnet assisted synchronous reluctance rotor assembly 14 configured with an optimal design and geometry to satisfy predetermined operating parameters. In particular, the electric machine 10 is designed to achieve a high efficiency, such as 80 percent over a predetermined output power and speed range, to have a high power density and/or a high torque density, to have a relatively wide peak power range, a maximum speed of at least 18,000 revolutions per minute (rpm), a relatively low cost by minimizing the required number of permanent magnets, a relatively low mass and inertia, and to fit into a relatively small packaging space. Alternative rotor assemblies 114, 214 that can be used in place of rotor assembly 14 are shown in FIGS. 4 and 5 that also have optimal designs and geometries to meet the same predetermined operating parameters. The electric machine 10 having any of the rotor assemblies 14, 114, 214 may be used in a powertrain 300, shown in FIG. 6 in an engine belt-driven arrangement to provide engine cranking, regeneration and torque assist modes.

Figure 2:
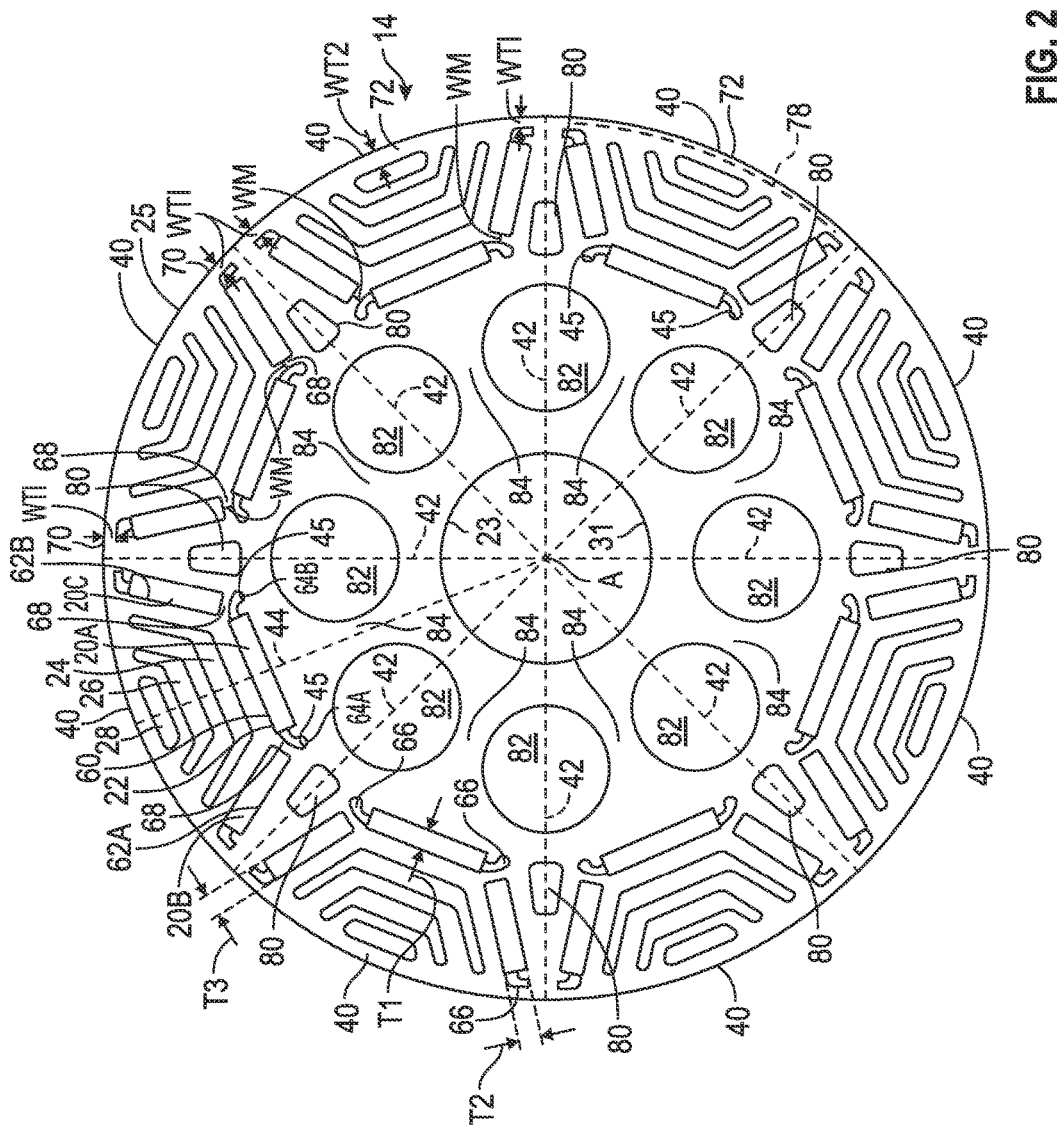
FIG. 2 is a schematic illustration in side view of a rotor assembly of the electric machine of FIG. 1.
Figure 3:
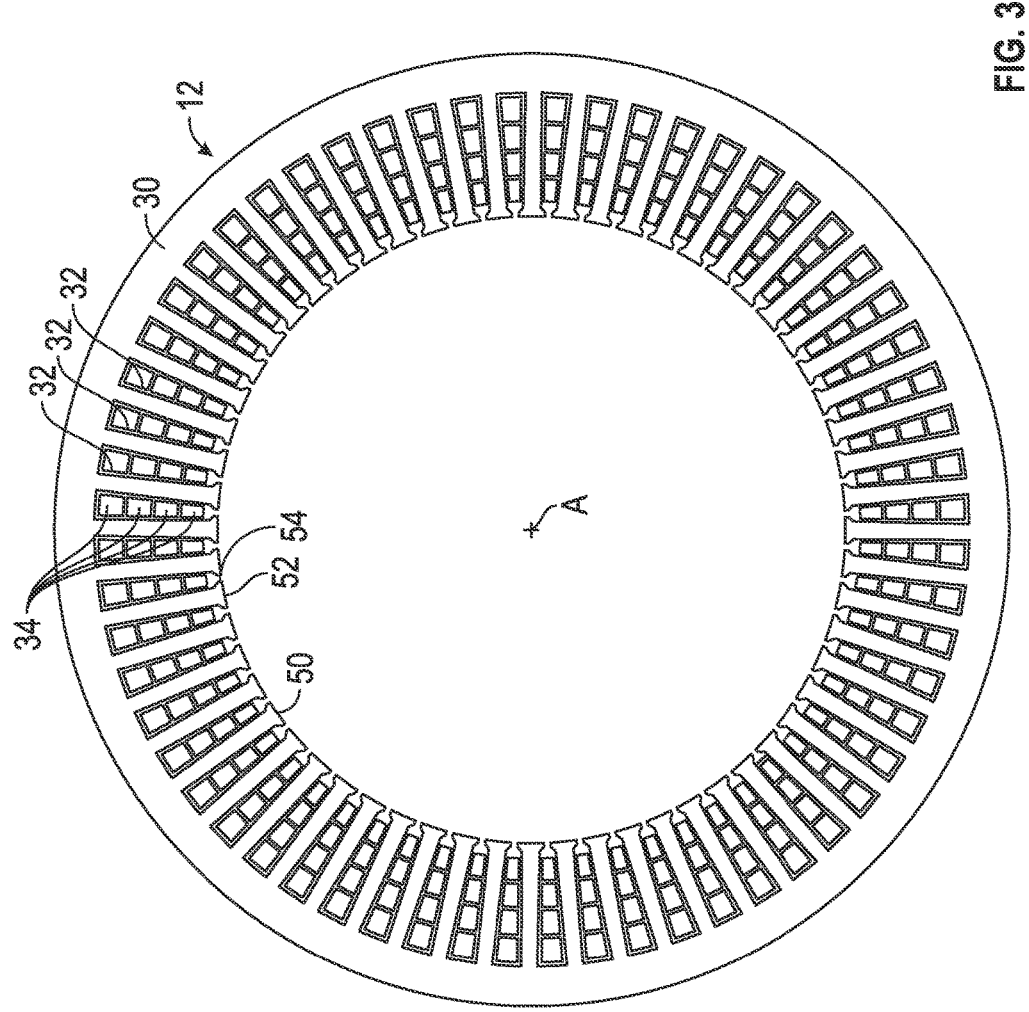
FIG. 3 is a schematic illustration in side view of a stator assembly of the electric machine of FIG. 1.
Figure 6:
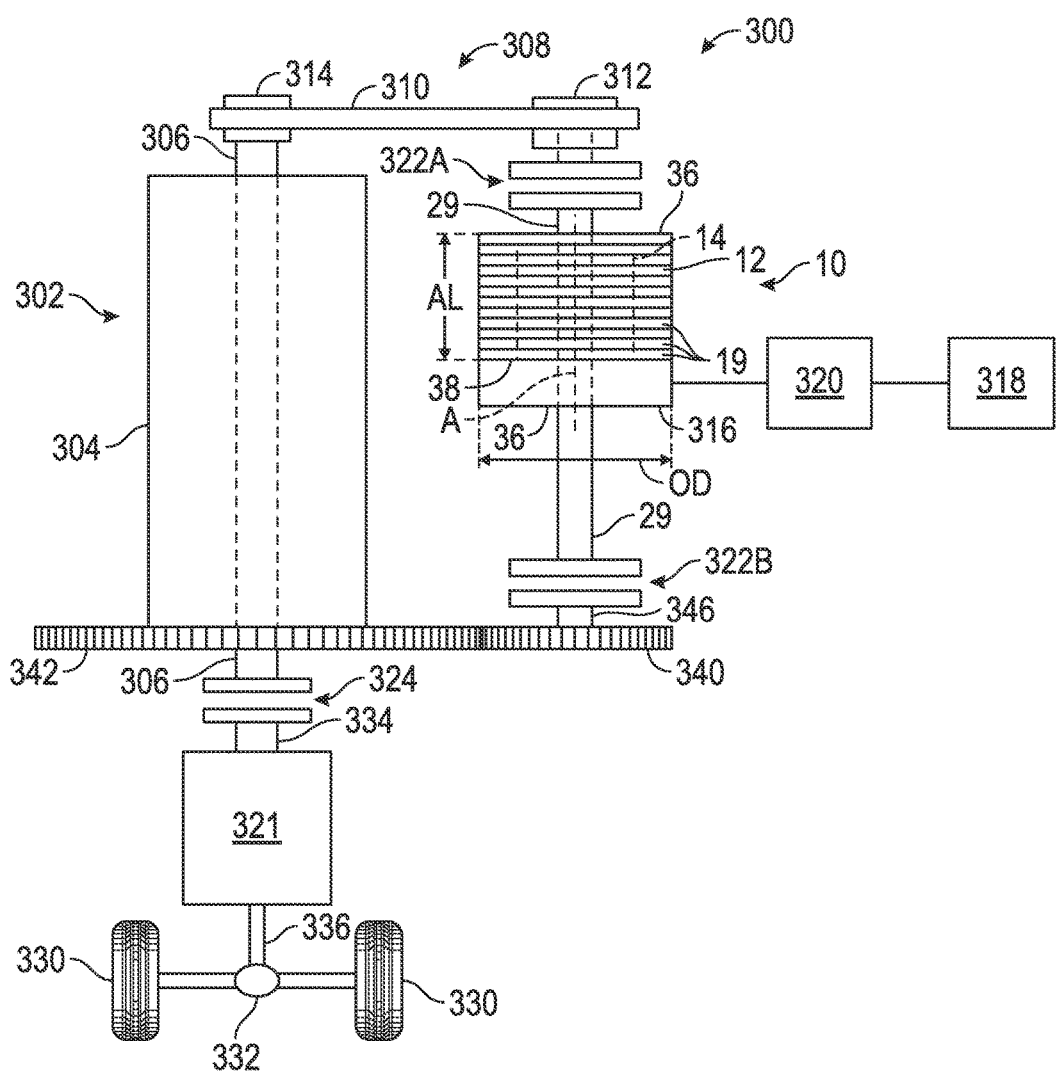
FIG. 6 is a schematic illustration of a powertrain including the electric machine of FIG. 1.

Referring to FIGS. 1-3, the stator assembly 12 radially surrounds the rotor assembly 14 with an air gap 16 defined therebetween. The electric machine 10 is configured so that the air gap 16 may be, by way of non-limiting example only, not less than 0.2 mm and not greater than 0.7 mm in order to maximize power and minimize the number of magnets 20A, 20B, 20C. By way of further non-limiting example, the air gap 16 may be not less than 0.3 mm and not greater than 0.5 mm. Both the stator assembly 12 and the rotor assembly 14 are generally annular in shape and are concentric about a longitudinal center axis A of the electric machine 10 (shown best in FIG. 6). The stator assembly 12 has a stator core 30 and the rotor assembly 14 has a rotor core 18. Both the stator core 30 and the rotor core 18 can be assembled from multiple laminations stacked axially along the axis A. For example, FIG. 6 shows stacks of stator laminations 19. It should be appreciated that a motor housing can radially surround an outer periphery of the stator laminations 19 and can support a motor shaft 29 of the electric machine 10. The housing is not shown for purposes of illustration in FIG. 6 so that the laminations 19 will be visible.

The rotor assembly 14 includes a rotor core 18 configured to support multiple permanent magnets 20A, 20B, 20C spaced around the rotor core 18. Specifically, the rotor core 18 has multiple rotor slots 22, 24, 26, 28, also referred to herein as barriers or barrier layers, arranged as multiple barrier layers including a first barrier layer 22, a second barrier layer 24, a third barrier layer 26, and a fourth barrier layer 28. The first barrier layer 22 is closest to an inner periphery 23 of the rotor core 18. The second barrier layer 24 is positioned between the first barrier layer 22 and the third barrier layer 26. The third barrier layer 26 is positioned between the second barrier layer 24 and the fourth barrier layer 28. The fourth barrier layer 28 is further from the inner periphery 23 than the barrier layers 22, 24, and 26. The fourth barrier layer 28 is closer to an outer periphery 25 of the rotor core 18 than is the first barrier layer 22, and at least portions of the second and third barrier layers 24, 26. In the embodiments shown, only the first barrier layer 22 houses magnets 20A, 20B, 20C. The other barrier layers 24, 26, 28 act as air barriers. In other embodiments, one or more of the barrier layers 24, 26, 28 can also be filled with permanent magnets.

The rotor assembly 14 is configured to be rotatable about the axis A that extends longitudinally through the center of the electric machine 10. The rotor core 18 is rigidly connected to and rotates with a motor shaft 29 (shown only in FIG. 6) that extends through a shaft opening 31 in the rotor core 18. The material of the rotor core 18 around the shaft opening 31 functions as a center shaft support 33.

The stator assembly 12 includes a stator core 30 that has multiple circumferentially-spaced stator slots 32. The stator slots 32 extend lengthwise along the axis A. The stator slots 32 are configured to house multi-phase stator windings 34. The stator windings 34 can be grouped into different sets, each of which carry an identical number of phases of electrical current, such as three phases, as is understood by those skilled in the art. The stator windings 34 may extend axially beyond first and second axial ends 36, 38 of the stator core 30, shown in FIG. 6. The axial length AL of the stacks of laminations 19 (i.e., the distances along the axis A between the axial ends 36, 38) not including any extending portion of the windings 34 is also referred to herein as the active length of the electric machine 10. A ratio of an outer diameter OD of the laminations 19 of the stator assembly 12 to the active length AL may be, by way of non-limiting example only, not less than 1.5 and not greater than 4, and, by way of non-limiting example only, with the active length AL not exceeding 65 mm and the outer diameter OD not exceeding 145 mm in order to satisfy predetermined packing space requirements for a particular application of the electric machine 10, such as in a vehicle powertrain.

Referring to FIG. 2, the rotor has eight poles 40 established at least partially by the placement of the permanent magnets 20A, 20B, 20C in the first barrier layer 22 generally circumferentially disposed in the rotor core 18 and by the selected polarity of the magnets 20A, 20B, 20C. Although eight poles 40 are shown, the electric machine 10 can be configured to have a different number of poles 40. By way of non-limiting example, the number of poles 40 can be between 6 and 12 in order to meet predetermined torque, power, and packaging parameters while remaining within predetermined noise limits. Each pole 40 includes a set of the multiple barrier layers 22, 24, 26, 28. The poles 40 are shown separated from one another by pole boundaries 42 extending radially through the rotor core 30. Each pole 40 includes all of the material of the rotor core 30 bounded by the respective pole boundaries 42 of the pole 40. A pole axis 44 of only one of the poles 40 is shown, although each pole 40 has a similar pole axis 44 extending radially through the center of the pole 40. The rotor core 18 is a steel material selected to maintain high speed rotational stress within predetermined limits. By way of non-limiting example, a computer-based rotational stress analysis of the rotor assembly 14 indicates that the furthest distal portions 45 of a center segment 60 of the first barrier layer 22 experience the greatest rotational stress and that, when the electric machine 10 is operated in motoring mode at 20,000 rpm and at 150 degrees Celsius, the stress at distal portion 45 will remain less than a predetermined maximum allowable rotational stress based on material properties.

Referring to FIGS. 1 and 3, in one example embodiment, the stator core 30 has sixty stator slots 32 circumferentially arranged about the stator core 30 and opening at an inner periphery 50 of the stator core 30 toward the air gap 16. Stator teeth 52 separate each of the stator slots 32 and are configured with ends 54 that retain the stator windings 34. A greatest common divisor (GCD) of the number of stator slots 32 and the number of poles 40 of the rotor core 18 is the largest positive integer that divides the number of stator slots 32 and the number of poles 40 without a remainder. In the embodiment shown, because the stator core 30 has 60 stator slots 32 and the rotor core 18 has eight poles 40, the GCD is 4. In other embodiments, the GCD can be a different number, and is preferably greater than or equal to 4.

A lowest common multiplier (LCM) of the number of stator slots 32 and the number of poles 40 is the smallest positive integer that is divisible by both the number of stator slots 32 and the number of poles 40. In the embodiment shown, because the stator core 30 has 60 stator slots 32 and the rotor core 18 has eight poles 40, the LCM is 120. In other embodiments, the LCM can be a different number, and is preferably greater than 60 to minimize cogging torque due to the interaction of the permanent magnets 20A, 20B, 20C and the teeth 52 of the stator core 30.

Referring now to FIG. 2, it is clear that the first barrier layer 22 has multiple discrete segments physically separated from one another by the material of the rotor core 18. Specifically, the segments include a center segment 60 that houses the magnet 20A. The first barrier layer 22 also has first and second wing segments 62A, 62B that are positioned generally near opposite ends 64A, 64B of the center segment 60 toward the outer periphery 25 and angling and away from one another. The center segment 60 is positioned so that the magnet 20A housed therein is generally perpendicular to a radius of the rotor core 18, with the radius being shown as and represented by the pole axis 44.

For costs savings, it is desirable that each of the permanent magnets 20A, 20B, and 20C have identical, rectangular shapes. This may be accomplished by configuring the center segment 60 and the first and second wing segments 62A, 62B to have identical thicknesses T1, T2, T3. In one non-limiting example, the thicknesses T1, T2, and T3 are between about 1 mm and 3.0 mm, and, in a more specific example, between about 2.0 and 2.5 mm, enabling magnets 20A, 20B, 20C with a suitable width to be fit therein. It is noted that although the permanent magnets 20A, 20B, 20C are rectangular in shape, the center segment 60 and wing segments 62A, 62B have a more complex shape, with a generally rectangular middle portion which fits to and holds the magnets 20A, 20B, 20C, and air pockets 66 extending at one or both ends. The lengths of the center segments 60 and the wing segments 62A, 62B of the stacked rotor laminations in the direction of the axis A may be equal. The length of center segments 60 in the direction of the axis A and wing segments 62A, 62B of the stacked rotor lamination may be equal. By doing that, the permanent magnets 20A, 20B, and 20C can have identical, rectangular shapes. Multiple magnets may be positioned in each of the aligned segments 20A, 20B, 20C in the direction of the length of the axis A.

The center segment 60 and the wing segments 62A, 62B of the first barrier layer 22 are separated from one another by material of the rotor core 18. In other words, the center segment 60 and the wing segments 62A, 62B are discreet and discontinuous from one another because the rotor core 18 defines a mid-bridge 68 between the center segment 60 and the first wing segment 62A, and between the center segment 60 and the second wing segment 62B. By way of non-liming example, the rotor core 18 can be configured so that a minimum width WM of each mid-bridge 68 is not less than 0.7 mm and not greater than 2 mm. The minimum width WM is defined as the minimum distance between the center segment 60 and the first wing segment 62A or the second wing segment 62B. A mid-bridge 68 configured in this manner helps to meet the predetermined rotational stress requirement of the electric machine 10, and minimizes necessary magnet material to potentially reduce manufacturing costs.

The material of the rotor core 18 also forms a first top bridge 70 between each of the first and second wing segments 62A, 62B and the outer periphery 25 of the rotor core 18. By way of non-limiting example, a minimum width WT1 of each first top bridge 70 is not less than 0.75 mm and not greater than 2 mm.

Additionally, the material of the rotor core 18 forms a second top bridge 72 that extends between each of the second barrier layer 24, the third barrier layer 26, and the fourth barrier layer 28 and the outer periphery 25. In other words, the second top bridge 72 is that portion of each rotor pole 40 that is between first and second wing segments 62A, 62B of the rotor pole 40 and the outer periphery 25. For purposes of illustration, FIG. 2 illustrates the circumferential angular expanse 78 (i.e., a segment of the circumference of the rotor core 18) of one of the second top bridges 72. By way of non-limiting example, a minimum width WT2 of each second top bridge 72 is not less than 1 mm and not greater than 3 mm. The magnets 20A, 20B, 20C create the torque-producing flux in the electric machine 10 and also serve to saturate the top bridges 70 to minimize a flux shunting effect.

For mass savings, the rotor core 18 has cavities 80 between adjacent wing segments 62A, 62B of adjacent sets of first barrier layers 22 of adjacent poles 40. Additional cavities 82 are positioned radially inward of the first barrier layers 22 and radially outward of the inner periphery 23. The cavities 80, 82 are in relatively low magnetic flux density regions of the rotor core 18 to reduce weight and inertia of the rotor core 18. This enables fast dynamic responsiveness of the electric machine 10, such as when a vehicle operator changes operating demands, thereby potentially increasing vehicle fuel economy.

The cavities 82 are positioned so that spokes 84 are defined by the rotor core 18 between adjacent ones of the cavities 82 and centered within each rotor pole 40. That is, the spokes 84 are centered under the center segments 60 and the center magnets 20A. By positioning the spokes 84 so that they are directly under the center segments 60, the spokes 84 are radially aligned with the poles 40 so that the center pole axis 42 of each pole 40 runs through the radial center of the respective spoke 84 under the center segment 20A. Accordingly, magnetic flux through the rotor core material of the spokes 84 aids in magnetizing the magnets 20A, 20B, 20C. The spokes 84 in the embodiment shown are non-linear in shape, as they are defined in part by the circular cavities 82. The spokes 84 extend generally radially between the portion of the rotor core 18 functioning as the center shaft support 33 and the center segments 60.

FIG. 4 shows an alternative rotor assembly 114 that can be used with the stator assembly 12 in lieu of the rotor assembly 14 in the electric machine 10. The rotor assembly 114 has a rotor core 118 that is different from rotor core 18 only in that barrier layers 122, 124, 126 and 128 corresponding respectively with first, second, third, and fourth barrier layers 22, 24, 26, and 28 have corners that are more rounded, cavities 180 corresponding with cavities 80 have rounded corners, and cavities 182 have a different shape and location than cavities 82, resulting in linear spokes 184 extending radially along the pole boundaries 42 instead of the pole axes 44 (labeled with respect to one pole 40 in FIG. 4). The spokes 184 are thus centered between the poles 40 rather than at the poles 40. Otherwise, the rotor assembly 114 is alike in all aspects to rotor assembly 14 and functions and performs as described with respect to rotor assembly 14 to satisfy the same predetermined operating parameters. A computer-based rotational stress analysis of the rotor assembly 114 indicates that the furthest distal portion 145 of the center segment 60A experiences the greatest rotational stress and that, when the electric machine 10 is operated in motoring mode at 20,000 rpm and at 150 degrees Celsius, the rotational stress at distal portion 145 will be less than the predetermined maximum operating parameter of allowable rotational stress based on material properties. In one example embodiment with the stator assembly 12 and the rotor assembly 114, the electric machine 10 may have a total weight less than 8 kilograms (kg), with the laminated stator core 30 weighing less than 3 kg, the laminated rotor core 18 weighing less than 2 kg, the stator windings 34 weighing less than 2.5 kg, and all of the magnets 20A, 20B, 20C weighing less than 0.5 kg.

FIG. 5 shows an alternative rotor assembly 214 that can be used with the stator assembly 12 in lieu of rotor assembly 14 in the electric machine 10. The rotor assembly 214 is alike in all aspects to rotor assembly 114 except that the rotor core 218 is configured so that the first barrier layers 122 are replaced with first barrier layers 220 that have center segments 260A that are continuous with and not discreet from the wing segments 262A and 262B. In other words, there are no mid-bridges separating the center segment 260A from the wing segments 262A and 262B in each first barrier layer 220, and the wing segments 262A, 262B extend from opposing ends of the center segment 260A. Additionally, the rotor core 218 is configured so that rotor spokes 284 extend along a pole axis 44 of each rotor pole 40, and cavities 282 between the rotor spokes 284 are centered along the pole boundaries 42. A computer-based rotational stress analysis of the rotor assembly 214 indicates that no portion will experience a rotational stress greater than the predetermined maximum allowable rotational stress based on material properties when the electric machine 10 is operated in motoring mode at 20,000 rpm and at 150 degrees Celsius.

The electric motor 10 can be used in many applications, such as on a vehicle. One non-limiting example use of the electric motor 10 is shown in FIG. 6. The electric motor 10 is included in the powertrain 300 of vehicle 302. The powertrain 300 also includes an engine 304 having a crankshaft 306. A belt drive train 308 operatively connects the electric machine 10 with the crankshaft 306 when a selectively engageable clutch 322A is engaged. The powertrain 300 is a hybrid powertrain and more specifically, a fossil fuel-electric hybrid powertrain because, in addition to the engine 14 as a first power source powered by fossil fuel, such as gasoline or diesel fuel, the electric machine 10 powered by stored electrical energy is available as a second power source. The electric machine 10 is controllable to function as a motor or as a generator and is operatively connectable to the crankshaft 306 of the engine 304 via the belt drive train 308 when the selectively engageable clutch 322A is engaged. The belt drive train 308 includes a belt 310 that engages with a pulley 312. The pulley 312 is connected to and rotates with the motor shaft 29 of the electric motor 10 only when the selectively engageable clutch 322A is engaged. The belt 310 also engages with a pulley 314 connectable to rotate with the crankshaft 306. When the pulley 312 is connected to rotate with the electric machine 10 and the pulley 314 is connected to rotate with the crankshaft 306, the belt drive train 308 establishes a driving connection between the electric machine 10 and the crankshaft 306. The electric machine 10 may be referred to as a belt-alternator-starter motor/generator in this arrangement. Alternatively, the belt drive train 308 may include a chain in lieu of the belt 310 and sprockets in lieu of the pulleys 312, 314. Both such embodiments of the belt drive train 308 are referred to herein as a "belt drive train".

A motor controller power inverter module (MPIM) 316 is operatively connected to the stator assembly 12. As shown, the MPIM 316 is mounted directly to the electric machine 10. A battery 318 is operatively connected to the stator assembly 12 through the MPIM 316 and through one or more additional controllers 320 that are also operatively connected to the engine 304, to a transmission 321, and to clutches 322A, 322B, and 324. The operative connections to the engine 304, transmission 321 and clutches 322A, 322B, and 324 are not shown for purposes of clarity in the drawings. The connections to the transmission 321 and clutches 322A, 322B, and 324 may be electronic, hydraulic, or otherwise.

When clutch 324 is engaged, and assuming internal clutches in the transmission 321 are controlled to establish a driving connection between the transmission input member 334 and the transmission output member 336, torque transfer can occur between the crankshaft 306 and vehicle wheels 330 through the transmission 321 and through a differential 332.

Under predetermined operating conditions, the controller 320 can cause the clutch 322B to be engaged, and the MPIM 316 can control the electric machine 10 to function as a motor. The electric machine 10 can then drive the crankshaft 306 via intermeshing gears 340, 342 to start the engine 14. Gear 340 is mounted on and rotates with a shaft 346 that rotates with the motor shaft 29 when clutch 322B is engaged. Gear 342 is mounted on and rotates with the crankshaft 306. Clutch 322A is not engaged during cranking of the engine 14.

When the engine 14 is on, and when predetermined operating conditions are met, the MPIM 316 is configured to control the stator assembly 12 to achieve a motoring mode in which the electric machine 10 adds torque to the crankshaft 306 using stored electrical power from the battery 318. The battery 318 has a nominal voltage of 12 volts in the embodiment shown. The electric motor 10 adds torque through the belt drive train 308, with clutch 322A engaged and clutch 322B not engaged. When the engine 14 is on and other predetermined operating conditions are met, the MPIM 316 is configured to control power flow in the stator assembly 12 to achieve a generating mode in which the electric machine 10 converts torque of the crankshaft 306 into stored electrical power in the battery 318, with clutch 322A engaged and clutch 322B not engaged. Operation of the electric machine 10 as a generator slows the crankshaft 306.

Figure 7:
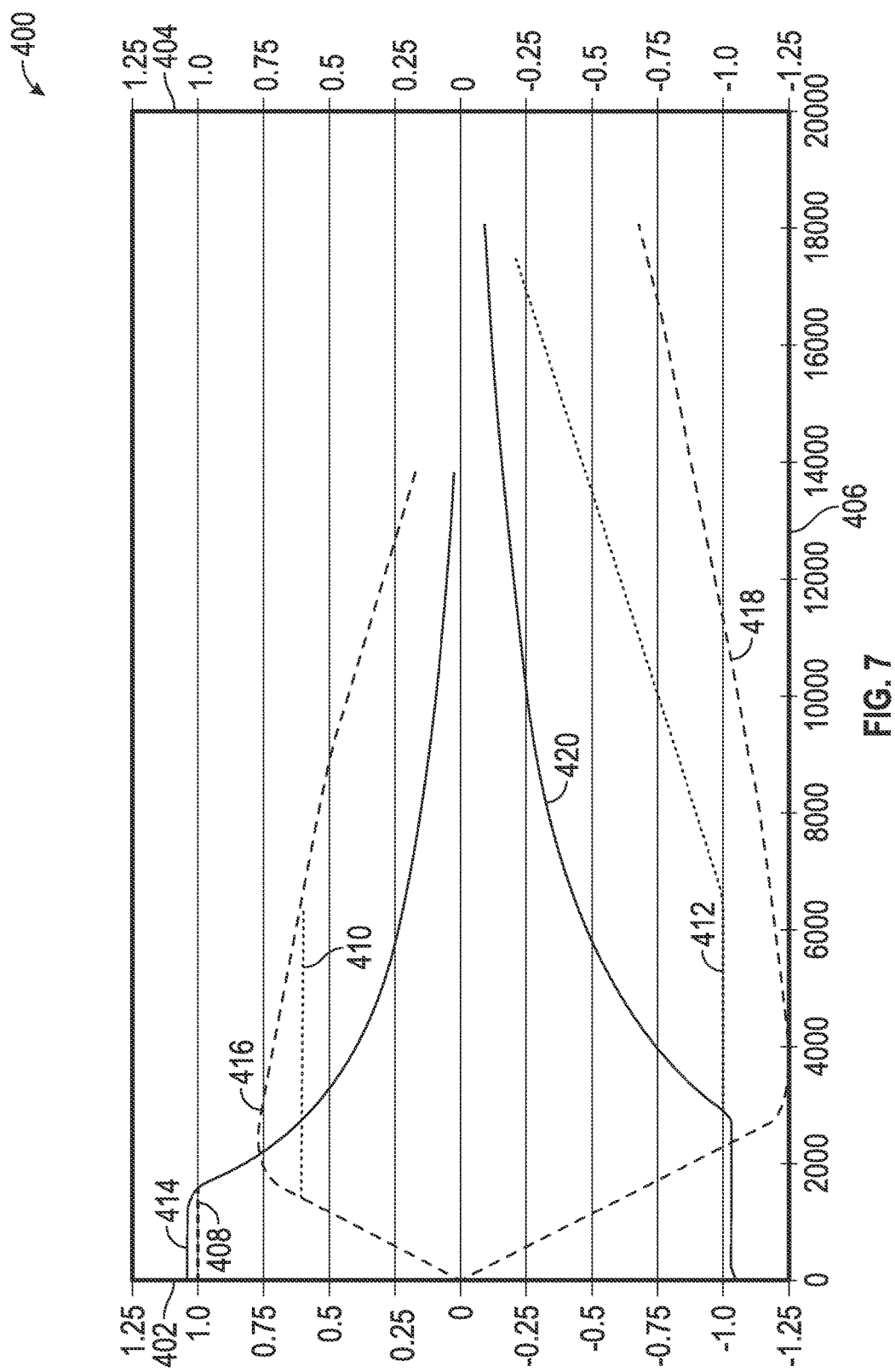
FIG. 7 is a plot of torque per unit of base torque (pu) and power per unit of base power (pu) versus speed (revolutions per minute) of the electric machine of FIG. 1.
Figure 8:
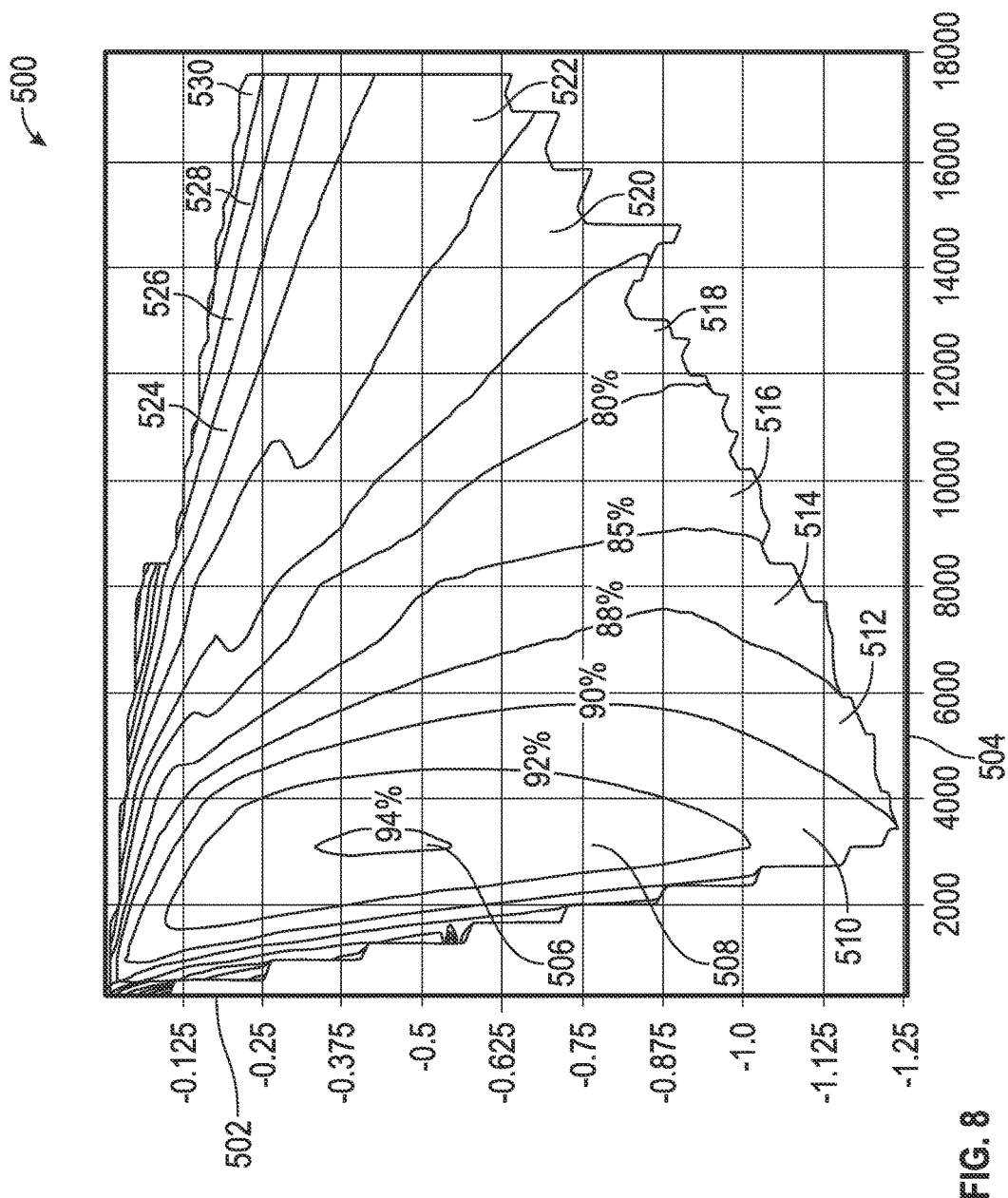
FIG. 8 is an efficiency map at different powers per unit of base power (pu) and speeds (revolutions per minute) during a generating mode of the electric machine of FIG. 1.

In the application shown in FIG. 6 or in other vehicle powertrain applications, the electric machine 10 is configured to achieve at least 80% efficiency over a predefined output power and speed range as illustrated in FIG. 8. The predefined output power range is 1500 to 5000 watts, and the predefined speed range is 2500-8000 rpm, and to have a maximum speed of at least 18,000 revolutions per minute. Referring to FIG. 7, a plot 400 shows torque of the electric machine 10 per unit of base torque (pu) on the left-side vertical axis 402. Power of the electric machine 10 per unit of base power (pu) is shown on the right side vertical axis 404. Speed of the rotor assembly 14 in revolutions per minute (rpm) is shown on the horizontal axis 406. Some of the predetermined operating parameters that the geometry of the electric machine 10 is specifically designed to satisfy include a motoring peak torque requirement 408, a motoring power requirement 410, and a generating power requirement 412. Motoring torque 414 theoretically achievable by the electric machine 10 exceeds the motoring peak torque requirement 408. Motoring power 416 theoretically achievable by the electric machine 10 exceeds the motoring power requirement 410. The magnitude of the generating power 418 theoretically achievable by the electric machine 10 exceeds the generating power requirement 412. Generating torque 420 is also shown, and extends at least to a speed of the electric machine 10 of 18,000 rpm.

FIG. 8 shows a map 500 of the efficiency of the electric machine 10 when operating in a 14 volt generating mode. Power of the electric machine 10 per unit of base power (pu) is shown on the vertical axis 502. Speed of the electric machine 10 in rpm is shown on the horizontal axis 504. Regions of different operating efficiencies of the electric machine 10 are shown bounded by dashed lines including: a 94% operating efficiency zone 506; a 92% operating efficiency zone 508; a 90% operating efficiency zone 510; an 88% operating efficiency zone 512; an 85% operating efficiency zone 514; an 80% operating efficiency zone 516; an approximately 75% operating efficiency zone 518; an approximately 65% operating efficiency zone 520; an approximately 55% operating efficiency zone 522; an approximately 45% operating efficiency zone 524; an approximately 35% operating efficiency zone 526; an approximately 25% operating efficiency zone 528; and an approximately 15% operating efficiency zone 530.

Figure 9:
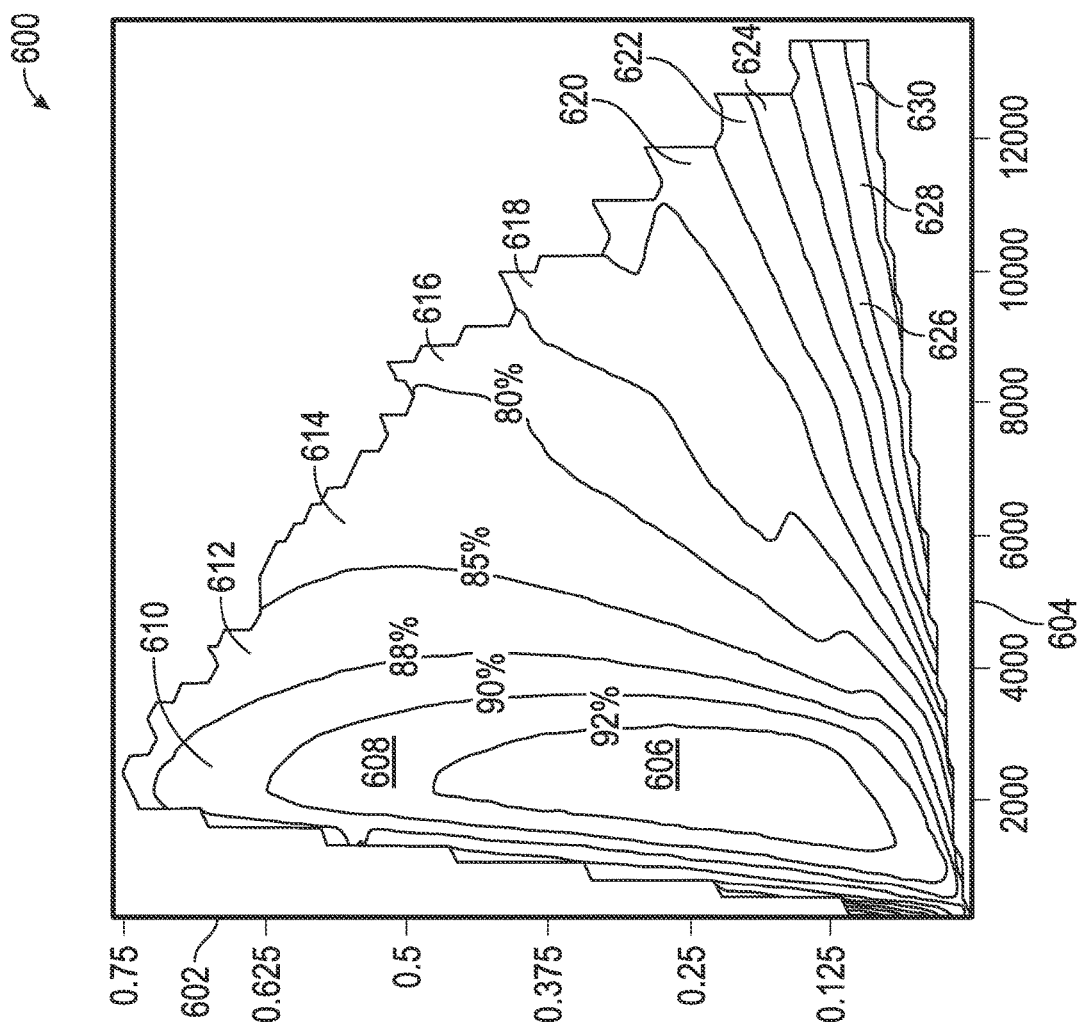
FIG. 9 is an efficiency map at different powers per unit of base power (pu) and speeds (revolutions per minute) during a motoring mode of the electric machine of FIG. 1.

FIG. 9 shows a map 600 of the efficiency of the electric machine 10 when operating in a 12 volt motoring mode. Power of the electric machine 10 per unit of base power (pu) is shown on the vertical axis 602. Speed of the electric machine 10 in rpm is shown on the horizontal axis 604. Regions of different operating efficiencies of the electric machine 10 are shown bounded by dashed lines including: a 92% operating efficiency zone 606; a 90% operating efficiency zone 608; an 88% operating efficiency zone 610; an 85% operating efficiency zone 612; an 80% operating efficiency zone 614; an approximately 75% operating efficiency zone 616; an approximately 70% operating efficiency zone 618; an approximately 65% operating efficiency zone 620; an approximately 60% operating efficiency zone 622; an approximately 55% operating efficiency zone 624; an approximately 50% operating efficiency zone 626; an approximately 45% operating efficiency zone 628; and an approximately 40% operating efficiency zone 630.

Figure 10:
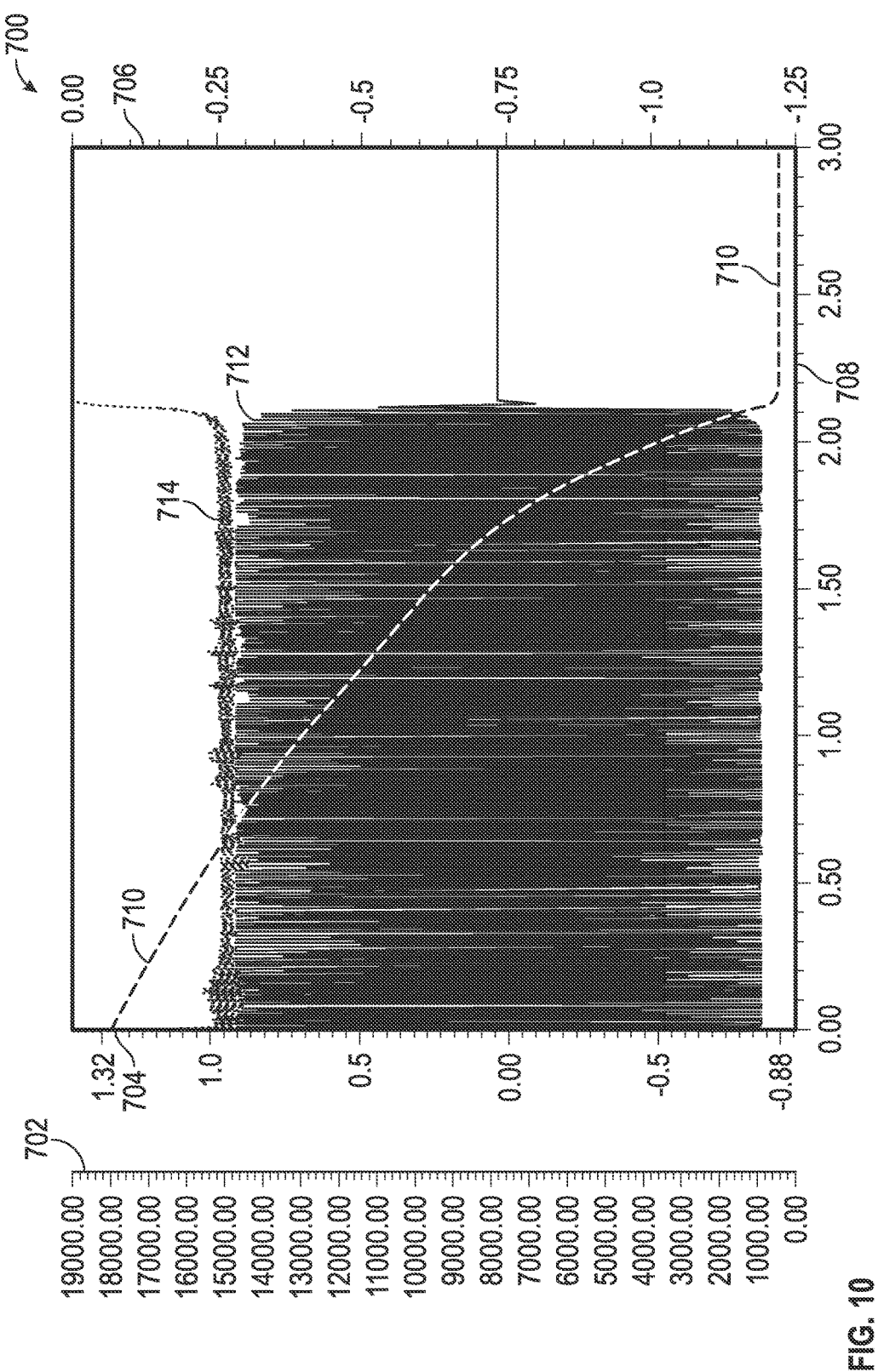
FIG. 10 is a plot of rotor speed (revolutions per minute), power per unit of base power (pu) and phase A current per unit of base current (pu) versus time (seconds) during a three-phase short circuit event.

FIG. 10 is a plot 700 of the rotational speed in rpm of the rotor assembly 14 in rpm on the far left vertical axis 702, a phase A current per unit of base current (pu) in the windings 34 of stator assembly 12 on the other left-side vertical axis 704, power of the electric machine 10 per unit of base power (pu) on the right side vertical axis 706, and time in seconds on the horizontal axis 708 during a three-phase short circuit event. The short circuit event occurs by connecting the three phases of the terminals 34 together while the rotor assembly 14 is free spinning (i.e., without torque on the motor shaft 29) at high speeds, such as greater than 4000 rpm. The resulting speed of the rotor assembly 14 is shown by curve 710. The phase current of phase A is shown by curve 712. The power loss in the electric machine 10 is shown by curve 714. In the exemplary embodiment shown in FIG. 10, the actual short circuit current is less than a predetermined value, for example, 0.9 multiplied by the rated current of the electric machine 10.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An electric machine comprising:
a rotor assembly having a rotor core configured to support permanent magnets spaced around the rotor core to define a number of rotor poles, and a pole axis extends radially through a center of each of the rotor poles; wherein:
the rotor core has multiple rotor slots arranged as multiple barrier layers at each of the rotor poles;
the barrier layers are positioned adjacent one another between an inner periphery of the rotor core and an outer periphery of the rotor core;
the barrier layers include a first barrier layer nearest the inner periphery having multiple segments and the barrier layers include a second barrier layer spaced from the first barrier layer;
the second barrier layer includes a center portion and side portions directly connected to the center portion, and the side portions of the second barrier layer extend angularly from respective ends of the center portion;
the side portions of the second barrier layer are narrower in configuration than the center portion of the second barrier layer;
the multiple segments of the first barrier layer include a center segment and first and second wing segments positioned at opposite ends of the respective center segment, and each of the first and second wing segments extend toward the outer periphery away from one another;
the pole axis extends through a center of the center segment of the first barrier layer and extends through a center of the center portion of the second barrier layer;
one of the multiple segments of the first barrier layer includes a pair of sides opposing each other that are substantially parallel to each other, and the pair of sides are linear;
the rotor core defines a plurality of cavities, with one of the cavities disposed between the first barrier layer of adjacent barrier layers;
the center segment of the first barrier layer defines respective pockets at the respective opposite ends of the center segment;
the first and second wing segments of the first barrier layer each define a pocket that extends from an end of the respective first and second wing segments; and
the center portion of the second barrier layer includes a pair of sides opposing each other that are substantially parallel to each other, and the pair of sides of the center portion of the second barrier layer are substantially parallel to a pair of sides of the center segment of the first barrier layer.

2. The electric machine of claim 1, wherein the permanent magnets are housed in at least some of the multiple segments of the first barrier layer.

3. The electric machine of claim 2, wherein the center segment includes the sides substantially parallel to each other, with one of the sides facing the inner periphery and the other one of the sides facing the outer periphery.

4. The electric machine of claim 3, wherein the rotor core defines a respective first top bridge between each of the first and second wing segments and the outer periphery; and
wherein a width of each first top bridge is not less than 0.7 mm and not greater than 2 mm.

5. The electric machine of claim 3, wherein the rotor core defines a respective mid-bridge between each of the first and second wing segments and the center segment; and
wherein a width of each mid-bridge is not less than 0.7 mm and not greater than 2 mm.

6. The electric machine of claim 3, wherein each of the first and second wing segments and the center segment has a thickness; and wherein the thickness of each of the first and second wing segments and the center segment is substantially the same.

7. The electric machine of claim 6, wherein the thickness of each of the first and second wing segments and the center segment is between 1 mm and 3.0 mm.

8. The electric machine of claim 3, wherein the permanent magnets are housed in each of the first and second wing segments and the center segment; and wherein the permanent magnet housed in the center segment of the first barrier layer is positioned generally perpendicular to the pole axis; and wherein the permanent magnets are substantially identical to one another and generally rectangular.

9. The electric machine of claim 3, wherein the barrier layers include at least a third barrier layer and a fourth barrier layer positioned between the first barrier layer and the outer periphery;
wherein the third barrier layer includes a center portion and side portions directly connected to the center portion of the third barrier layer, and the side portions of the third barrier layer extend angularly from ends of the center portion of the third barrier layer;
wherein the side portions of the third barrier layer are narrower in configuration than the center portion of the third barrier layer;
wherein the fourth barrier layer is elongated and terminates at ends, and the ends of the fourth barrier layer are disposed between and face respective side portions of the third barrier layer;
wherein the center portion of the third barrier layer includes a pair of sides opposing each other that are substantially parallel to each other, and the pair of sides of the center portion of the third barrier layer are substantially parallel to the sides of the center portion of the second barrier layer;

wherein the rotor core defines a respective second top bridge between each of the second and the third barrier layers and the outer periphery; and wherein a width of each second top bridge is not less than 1 mm and not greater than 3 mm.

10. The electric machine of claim 1, wherein the cavities are disposed between adjacent the first and second wing segments of adjacent sets of the first barrier layers of adjacent rotor poles to reduce mass.

11. The electric machine of claim 1, wherein the rotor core includes a center shaft support and multiple spokes extending radially outward from the center shaft support; and wherein the multiple spokes are radially aligned with the rotor poles.

12. The electric machine of claim 1, further comprising:
a stator assembly surrounding the rotor assembly with a gap therebetween;
wherein the stator assembly has a number stator slots circumferentially-spaced around the stator assembly and configured to support stator windings; and
wherein a lowest common multiplier of the number of stator slots and the number of rotor poles is greater than 60.

13. The electric machine of claim 1, further comprising:
a stator assembly surrounding the rotor assembly with a gap therebetween;
wherein the stator assembly has a number of stator slots circumferentially-spaced around the stator assembly and configured to support stator windings; and
wherein a greatest common divisor of the number of stator slots and the number of rotor poles is at least 4.

14. The electric machine of claim 1, further comprising:
a stator assembly surrounding the rotor assembly with a gap therebetween;
wherein the stator assembly has multiple axially-stacked stator laminations; and
wherein a ratio of an outer diameter of the stator laminations to an axial length of the stator laminations is not less than 1.5 and not greater than 4.

15. The electric machine of claim 14, wherein the gap is not less than 0.2 mm and not greater than 0.7 mm; and wherein the outer diameter of the stator laminations is not greater than 145 mm and the axial length of the stator laminations is not greater than 65 mm.

16. The electric machine of claim 1, further comprising:
a stator assembly surrounding the rotor assembly with a gap therebetween;
a motor controller power inverter module (MPIM) operatively connected to the stator assembly;
and in combination with:
an engine having a crankshaft;
a belt drive train operatively connecting the electric machine with the crankshaft; and
a battery operatively connected to the stator assembly;
wherein the MPIM is configured to control the stator assembly to achieve a motoring mode in which the electric machine adds torque to the crankshaft using stored electrical power from the battery;
wherein the MPIM is configured to control the stator assembly to achieve a generating mode in which the electric machine converts torque of the crankshaft into stored electrical power in the battery; and
wherein the electric machine is configured to achieve at least 80% efficiency over a predetermined range of output power and speed, and to have a maximum speed of at least 18,000 revolutions per minute.

17. The electric machine of claim 1, wherein a short circuit current over an entire speed range of the electric machine is below 0.9 multiplied by a rated current of the electric machine.

18. The electric machine of claim 1, wherein the respective pockets at the respective opposite ends of the center segment connect to respective ends of the first and second wing segments, and the respective pockets at the respective opposite ends of the center segment are generally hook-shaped in configuration, and the pockets at the respective opposite ends of the center segment have a thickness less than a thickness of the center segment, and the respective pocket at the end of the respective first and second wing segments is generally hook-shaped in configuration, and the generally hook-shaped configuration of the pocket at the end of the first wing segment and the generally hook-shaped configuration of the pocket at the end of the second wing segment each extend to respective distal ends that face in opposite directions from each other.

19. An electric machine comprising:
a rotor assembly having a rotor core configured to support permanent magnets spaced around the rotor core to define a number of rotor poles;
wherein the rotor core has multiple rotor slots arranged as multiple barrier layers at each of the rotor poles between an inner periphery of the rotor core and an outer periphery of the rotor core;
wherein the barrier layers include a first barrier layer nearest the inner periphery having multiple segments including a center segment and first and second wing segments positioned at opposite ends of the center segment, and each of the first and second wing segments extend toward the outer periphery away from one another;
wherein one of the multiple segments includes a pair of sides opposing each other, with the pair of sides extending a length and the pair of sides spaced from each other to define a thickness therebetween, and wherein the thickness is less than the length, and wherein the pair of sides along the length are linear;
wherein the thickness of each of the first and second wing segments and the center segment is between 2.0 mm and 2.5 mm;
a stator assembly surrounding the rotor assembly with a gap therebetween;
wherein:
the gap is not less than 0.3 mm and not greater than 0.5 mm;
the rotor core defines a plurality of cavities, with one of the cavities disposed between the first barrier layer of adjacent barrier layers;
the center segment of the first barrier layer defines respective pockets at the respective opposite ends;
the first and second wing segments of the first barrier layer each define a pocket that extends from one end of the respective first and second wing segments, with the pocket of each of the first and second wing segments disposed between the respective end of the first and second wing segments and the outer periphery of the rotor core;
the respective pockets of the center segment of the first barrier layer are generally hook-shaped in configuration, and the respective pocket of the first and second wing segments of the first barrier layer is generally hook-shaped in configuration;
the barrier layers include a second barrier layer spaced from the first barrier layer;

the second barrier layer includes a center portion and side portions directly connected to the center portion, and the side portions of the second barrier layer extend angularly from ends of the center portion of the second barrier layer;

the side portions of the second barrier layer are narrower in configuration than the center portion of the second barrier layer;

the generally hook-shaped configuration of the pocket at the first wing segment extends to a distal end that faces outwardly away from the side portions of the second barrier layer, and the generally hook-shaped configuration of the pocket at the second wing segment extends to a distal end that faces outwardly away from the side portions of the second barrier layer;

the center portion of the second barrier layer includes a pair of sides opposing each other that are substantially parallel to each other, and the pair of sides of the center portion of the second barrier layer are substantially parallel to a pair of sides of the center segment of the first barrier layer;

the barrier layers include a third barrier layer spaced from the first and second barrier layers;

the third barrier layer includes a center portion and side portions directly connected to the center portion, and the side portions of the second barrier layer extend angularly from ends of the center portion of the third barrier layer;

the side portions of the third barrier layer are narrower in configuration than the center portion of the third barrier layer;

the center portion of the third barrier layer includes a pair of sides opposing each other that are substantially parallel to each other, and the pair of sides of the center portion of the third barrier layer are substantially parallel to the sides of the center portion of the second barrier layer;

the barrier layers include a fourth barrier layer spaced from the first, second and third barrier layers;

the fourth barrier layer is elongated and terminates at ends, and the ends of the fourth barrier layer are disposed between and face respective side portions of the third barrier layer; and the fourth barrier layer includes a pair of sides opposing each other that are substantially parallel to each other, and the pair of sides of the fourth barrier layer are substantially parallel to the sides of the center portion of the third barrier layer.

20. The electric machine of claim 19, wherein the stator assembly has multiple axially-stacked stator laminations; and wherein a ratio of an outer diameter of the stator laminations to an axial length of the stator laminations is not less than 1.5 and not greater than 4.

* * * * *